United States Patent [19]

Beckman

[11] Patent Number: 5,306,976
[45] Date of Patent: Apr. 26, 1994

[54] MOTOR AND STATIONARY ASSEMBLY THEREFOR HAVING END CAPS AND OVERLAPPING FILM SLOT INSULATION

[75] Inventor: Nicholas J. Beckman, Columbia City, Ind.

[73] Assignee: General Electric Company, Fort Wayne, Ind.

[21] Appl. No.: 10,883

[22] Filed: Jan. 29, 1993

[51] Int. Cl.$^5$ ............................................. H02K 5/00
[52] U.S. Cl. ...................................... 310/215; 310/89; 310/179; 310/214; 310/254; 310/260
[58] Field of Search ............... 310/215, 214, 218, 260, 310/179, 259, 260, 42, 43, 45, 89, 91, 254, 269; 336/196, 198

[56] References Cited

U.S. PATENT DOCUMENTS

| | | | |
|---|---|---|---|
| 2,778,964 | 1/1957 | Balke | 310/214 |
| 2,985,780 | 5/1961 | Bigelow et al. | 310/215 |
| 3,122,667 | 2/1964 | Baciu | 310/45 |
| 3,334,255 | 8/1967 | Peters | 310/215 |
| 3,495,109 | 2/1970 | Ames | 310/260 |
| 4,025,840 | 5/1984 | Brissey | 310/214 |
| 4,160,926 | 7/1979 | Cope | 310/215 |
| 4,204,318 | 5/1980 | Kirbis et al. | 29/734 |
| 4,340,829 | 7/1982 | McCoy | 310/71 |
| 4,413,405 | 11/1983 | Doke | 310/214 |
| 4,481,435 | 11/1984 | Loforese | 310/71 |
| 4,728,836 | 3/1988 | Wrobel | 310/71 |
| 4,808,872 | 2/1989 | Lund et al. | 310/215 |
| 4,893,041 | 1/1990 | Snider | 310/43 |
| 4,904,893 | 2/1990 | Snider | 310/260 |
| 5,081,382 | 1/1992 | Collings | 310/260 |
| 5,194,775 | 3/1993 | Cooper | 310/260 |

FOREIGN PATENT DOCUMENTS

| | | | |
|---|---|---|---|
| 3150970 | 6/1983 | Fed. Rep. of Germany | 310/71 |
| 0924292 | 7/1947 | France | 310/215 |
| 0693310 | 8/1965 | Italy | 310/215 |

Primary Examiner—R. Skudy
Attorney, Agent, or Firm—Ralph E. Krisher, Jr.

[57] ABSTRACT

A motor having a rotatable assembly which rotates about an axis of rotation and having a stationary assembly in magnetic coupling relation with the rotatable assembly. The stationary assembly includes a stator core which has two ends and a plurality of teeth. Adjacent teeth define a slot therebetween. The teeth are wrapped with windings adapted for commutation in at least one preselected sequence. The stationary assembly also includes a slot liner in each of the slots. The slot liners are disposed between the stator core and the windings, thus, separating the windings from the stator core. An end cap on each end of the stator core retains the slot liners in their respective slots.

21 Claims, 2 Drawing Sheets

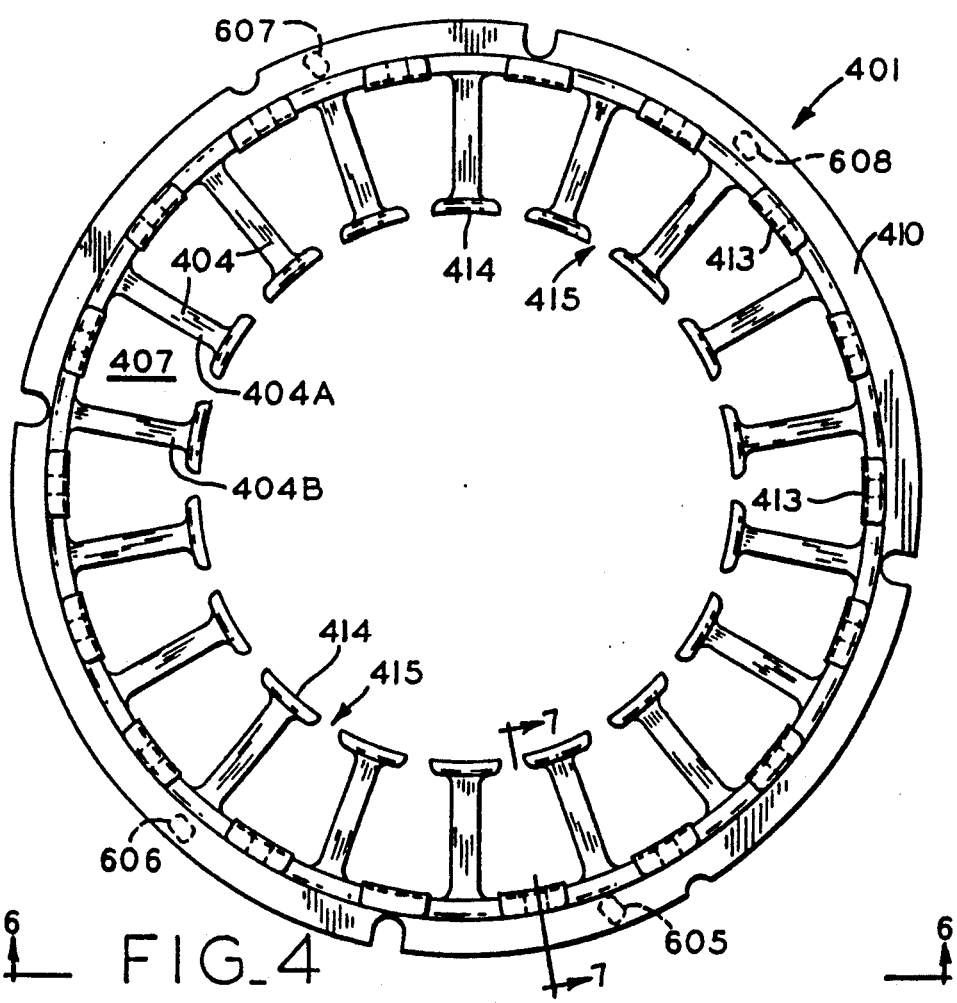
FIG_4
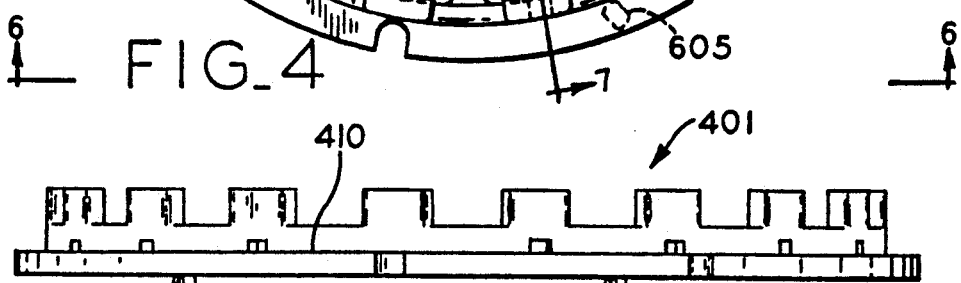
FIG_6
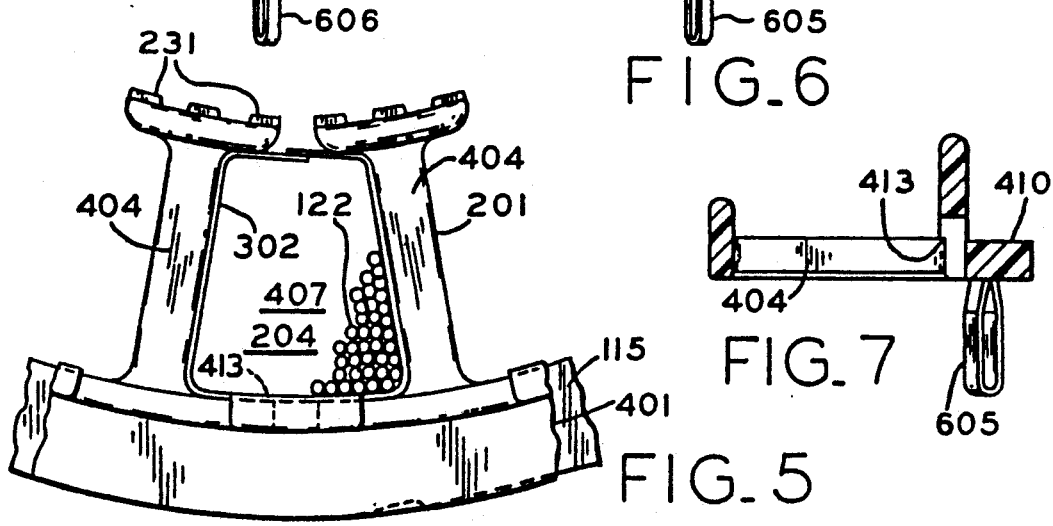
FIG_5
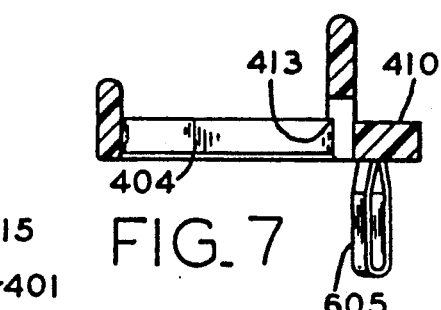
FIG_7

MOTOR AND STATIONARY ASSEMBLY THEREFOR HAVING END CAPS AND OVERLAPPING FILM SLOT INSULATION

BACKGROUND OF THE INVENTION

This invention generally relates to motors and stationary assemblies therefor and, in particular, film slot liners and end caps for insulating the slots of the stationary assembly of such a motor and for retaining the slot liners in the slots.

Motors include stator cores which are typically manufactured by bonding a number of steel laminations together. A number of teeth extend from the core of a motor to form slots between adjacent teeth. Coils of wire are wrapped around the teeth and through the slots in either a distributed or salient winding pattern. Thus, energizing the coils generates an electromagnetic field in the core for rotating a rotatable assembly of the motor. In order to generate the electromagnetic field and prevent shorting, it is necessary to electrically insulate the core from the coils of wire.

In addition to having slot insulators, present motors require the insertion of insulative wedges between the coils and the tips of the stator core's teeth. Wedges serve the dual purpose of insulating the tips of the teeth from the coils and retaining the coils in the slots. The use of wedges, however, impedes machine winding. As an alternative to wedges, some slot insulators include flaps which abut each other, or a single flap which abuts a side wall of the insulator, to cover the opening of the slot for retaining the wire in the slots during winding and for insulating at the tips of the teeth. Flaps of the present designs, however, tend to become wrapped under the wire during high volume machine winding. Therefore, present insulators are disadvantageously adapted to improved winding and high volume machine winding.

Further, present slot insulators include cuffs for covering the ends of the teeth and for retaining the insulators in the slots. Such cuffs, however, are disadvantageous to high volume machine production of the motor's stationary assembly because they impede wire control during machine winding of the stator core. Without the cuffs, though, present motors cannot easily retain the slot insulators in the slots for machine winding and the ends of the teeth are not insulated from the coils of wire.

SUMMARY OF THE INVENTION

An object of the present invention is the provision of an improved motor, the stationary assembly of which has a stator core with a plurality of teeth wrapped by winding stages and having slots in between adjacent teeth.

Another object of the invention is to provide a motor which permits a slot liner in each of the slots being disposed between the stator core and the winding stages.

Another object is to provide such slot liners for electrically insulating the stator core from the windings.

Still another object is to provide such a motor which permits such slot liners to be cuffless.

It is yet another object of this invention to provide a motor which permits such slot liners to separate the stator core from the winding stages at the tips of the teeth without inserting wedges therebetween.

Another object of the invention is to provide such slot liners which retain the winding stages in the slots of the stator core.

Yet another object is to provide end caps on the ends of the stator core for retaining the slot liners in their respective slots.

Another object of the invention is to provide such end caps which electrically insulate the ends of the stator core from the winding stages.

It is another object to provide a continuous barrier for electrically insulating the stator core from the winding stages and for retaining the winding stages in the slots.

Yet another object is to provide a motor which facilitates high volume machine winding of the stator core.

A still further object is to provide a motor which provides improved wire control during machine winding of the stator core.

Another object of the invention is to provide such a motor in a manner which is economically feasible and commercially practical.

Briefly described, a motor of the present invention has a rotatable assembly and a stationary assembly. The rotatable assembly rotates about an axis of rotation and the stationary assembly is in magnetic coupling relation with the rotatable assembly. The stationary assembly of the present invention includes a stator core which has two ends and a plurality of teeth. Adjacent teeth define a slot therebetween. The teeth are wrapped with winding stages adapted for commutation in at least one preselected sequence. The stationary assembly also includes a slot liner in each of the slots. The slot liners are disposed between the stator core and the winding stages, thus, separating the winding stages from the stator core. An end cap on each end of the stator core retains the slot liners in their respective slots.

In another form of the invention, a continuous barrier electrically insulates a stator core from winding stages in a motor. The motor has a rotatable assembly and a stationary assembly. The rotatable assembly rotates about an axis of rotation and the stationary assembly is in magnetic coupling relation with the rotatable assembly. The stator core has two ends and a plurality of teeth. Adjacent teeth define a slot therebetween. The barrier includes a slot liner in each of the slots disposed between the stator core and the winding stages. The slot liners separate the winding stages from the stator core. The barrier also includes an end cap on each end of the stator core. Each end cap has a plurality of legs with adjacent legs defining an opening therebetween. Each opening between the adjacent legs is in registry with one of the slots so that the legs overlie the axially facing surfaces of the teeth for separating the winding stages from the stator core at axially facing surfaces of the teeth. The slot liners and end caps overlap at the ends of the stator core to form the continuous barrier between the winding stages and the stator core.

In another form of the invention, an end cap retains a slot liner in each of a plurality of slots in a stator core. The stator core has two ends and is in magnetic coupling relation with a rotor. The rotor rotates about an axis of rotation. The stator core has a plurality of teeth and winding stages on the teeth adapted for commutation in at least one preselected sequence. Adjacent teeth defining a slot therebetween and each slot extends lengthwise generally from end to end of the stator core. The slot liners are disposed between the stator core and the winding stages for separating the winding stages from the stator core. The end cap includes a ring which overlaps one of the ends of the slots to define a shoulder. The shoulder overlaps the slot liners to retain the slot liners in their respective slots. The end cap also includes a plurality of legs extending radially from the ring with adjacent legs defining an opening therebetween. Each opening between the adjacent legs is in registry with one of the slots and the legs overlie the axially facing surfaces of the teeth for separating the winding stages from the stator core at one of the ends of the stator core.

In yet another form of the invention, a slot liner electrically insulates a stator core from winding stages in a motor. The stator core is in magnetic coupling relation with a rotor which rotates about an axis of rotation and has a plurality of teeth and winding stages on the teeth adapted for commutation in at least one preselected sequence. Adjacent teeth define a slot therebetween which is defined by opposing surfaces of adjacent teeth and a wall extending between the adjacent teeth at the bottom of the slot. The slot has a radially facing opening generally opposite the bottom wall. The slot liners are disposed between the stator core and the winding stages for separating the winding stages from the stator core. Each slot liner includes a transverse wall and opposing side walls projecting outwardly from opposite edge margins of the transverse wall. The side walls and transverse wall of the slot liner are substantially coterminous with the opposing surfaces and bottom wall defining the slot. Flaps project inwardly from free edge margins of the side walls generally opposite the transverse wall and overlap to close the radially facing opening of the slot. The winding stages are coils of wire wrapped around the teeth and the slot liners and the flaps deflect to permit insertion of the wire into the radially facing opening of the slot as the wire is wrapped.

Other objects and features will be in part apparent and in part pointed out hereinafter.

BRIEF DESCRIPTION OF THE DRAWINGS

FIG. 4 is a plan view of an end cap for one end of the stationary assembly of FIG. 1.

FIG. 5 is an enlarged and fragmentary plan view of the end cap of FIG. 4 retaining the slot liner of FIG. 3 in its respective slot.

FIG. 6 is a side view of the end cap of FIG. 4 taken along line A—A.

FIG. 7 is an enlarged cross-sectional view of the end cap of FIG. 4 taken along line B—B.

Corresponding reference characters indicate corresponding parts throughout the several views of the drawings.

DETAILED DESCRIPTION OF PREFERRED EMBODIMENTS

Figure 1:
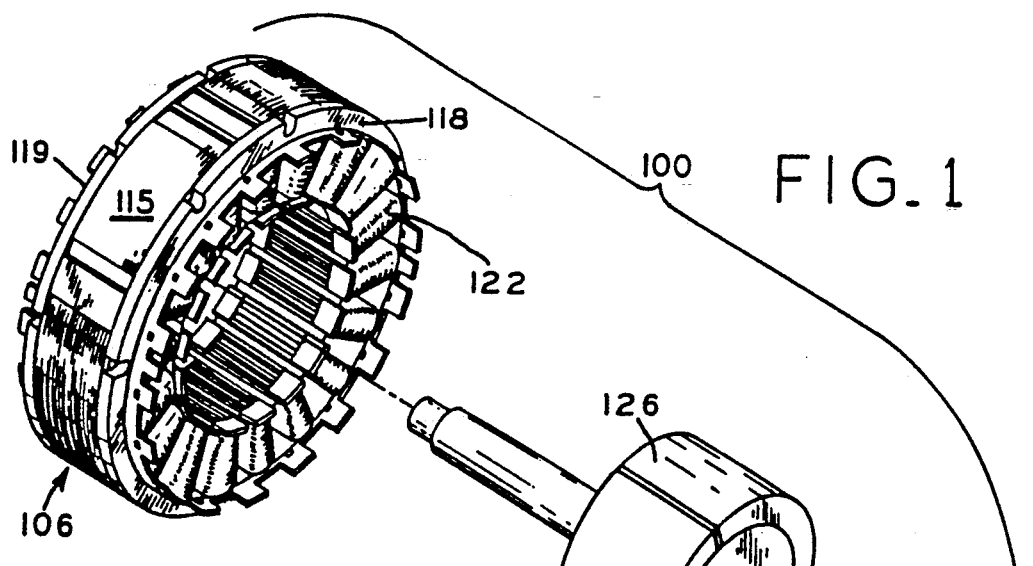
FIG. 1 is an exploded, perspective view of a stationary assembly and a rotatable assembly of a motor embodying teachings of one preferred embodiment of the invention.

Referring now to the drawings, FIG. 1 illustrates portions of a motor 100 which includes a rotatable assembly 103 and a stationary assembly 106. The rotating assembly 103 of motor 100 rotates about an axis 109 of rotation as the rotatable assembly rotates on a shaft 112. The stationary assembly 106 is in magnetic coupling relation with the rotatable assembly 103. Stationary assembly 106 includes a stator core 115 which has ends 118 and 119. In one preferred embodiment, the stator core 115 has a plurality of teeth (see FIG. 2) which are wrapped by winding stages 122. In general, winding stages 122 are conductive paths, such as wire. Therefore, electrically energizing the winding stages 122 generates an electromagnetic field for rotating the rotatable assembly 103 of the motor 100. Winding stages 122 are adapted for commutation in at least one preselected sequence. Although the motor 100 is shown in a standard configuration with the rotatable assembly 103 within stationary assembly 106 and with teeth extending radially inwardly, it is contemplated that the invention may be used on an inside-out motor wherein the stationary assembly 106 is within the rotatable assembly 103.

Preferably, stator core 115 is a stack of steel laminations held together by welding, adhesive bonding or another suitable means. Alternatively, the winding stages 122 themselves hold the laminations together or the stator core 115 is an integral piece of steel. Those skilled in the art will understand all suitable means for holding the laminations together. FIG. 1 illustrates one preferred embodiment of the invention in which the motor 100 is a salient pole motor. In other words, the winding stages 122 include three wires wrapped into coils around the teeth of the stator core 115. Each wire represents a phase of motor 100 and alternately wraps one-third of the teeth. While stationary assembly 106 is illustrated for purposes of disclosure, it is contemplated that other stationary assemblies of various other constructions having different shapes or winding patterns and with different numbers of teeth may be utilized within the scope of the invention so as to meet at least some of the objects thereof.

In one preferred embodiment, the rotatable assembly 103 includes three permanent magnet elements 125, 126 and 127, although it is contemplated that the invention may be implemented in motors which do not employ permanent magnet elements in the rotatable assembly, such as inductive motors and switched reluctance motors. Energizing winding stages 122 in a temporal sequence establishes magnetic poles which provide a radial magnetic field. The radial magnetic field moves clockwise or counterclockwise around the stator core 115 depending on the preselected sequence or order in which the winding stages 122 are energized. When the moving field intersects with the flux field of the magnet poles, the rotating assembly 103 rotates relative to the stationary assembly 106 in the desired direction to develop a torque. The developed torque is a direct function of the intensities or strengths of the magnetic fields. For example, in an electronically commutated motor, the winding stages 122 are commutated without brushes by sensing the rotational position of the rotatable assembly 103 as it rotates within the stator core 115. Electrical signals generated as a function of the rotational position of the rotating assembly 103 sequentially apply a DC voltage to each of the winding stages 122 in different preselected orders or sequences that determine the direction of the rotation. Position sensing may be accomplished by any known techniques such as Hall sensors or a position-detecting circuit responsive to the back electromotive force (EMF) to provide a simulated signal indicative of the rotational position of the rotating assembly 103 to control the timed sequential application of voltage to the winding stages 122 of the motor 100.

Accordingly, motor 100 may also include means (not shown), such as a printed circuit board, for sensing the back electromotive (EMF) force induced in each of the winding stages 122 by permanent magnet elements 125-127. The printed circuit board commutates the winding stages 122 in response to the sensing of the back emf induced therein to rotate rotatable assembly 103. Other means for position sensing may also be used.

Figure 2:
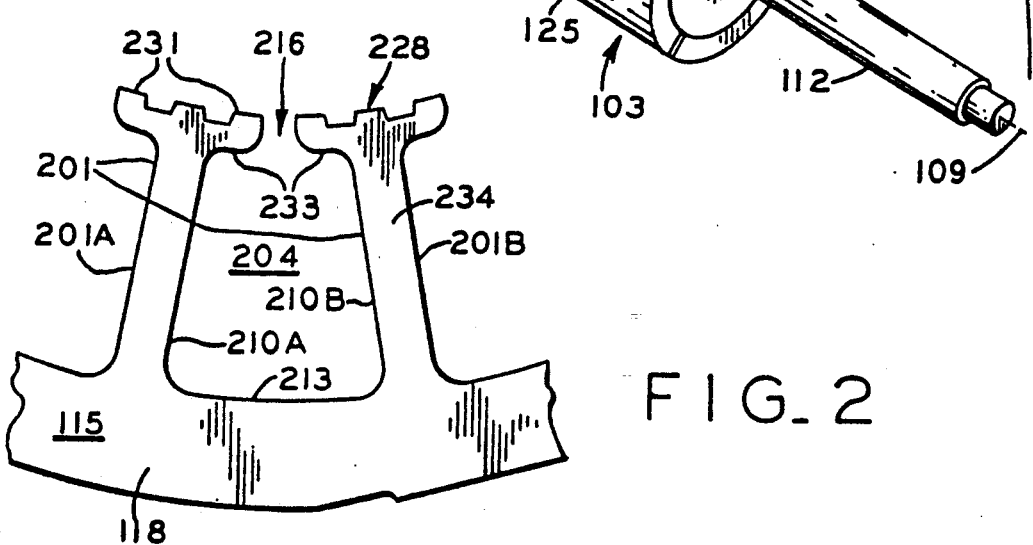
FIG. 2 is an enlarged and fragmentary plan view of the stationary assembly of FIG. 1 having adjacent teeth which define a slot.

Referring to FIG. 2, a portion of the stationary assembly 106, particularly stator core 115, is illustrated showing as a tooth 201A and a tooth 201B. Teeth 201A-B, in addition to a plurality of similar teeth (not shown), are referred to generally as teeth 201. Adjacent teeth of the stator core 115, such as tooth 201A and tooth 201B, define a slot 204 therebetween such that the number of slots 204 corresponds to the number of teeth 201. Each slot 204 extends lengthwise generally from end 118 to end 119 of the stator core 115. For the sake of simplicity, FIG. 2 illustrates a single slot 204.

Tooth 201A includes an axially extending surface 210A which opposes a surface 210B of adjacent tooth 201B. Also, an axially extending wall 213 extends between adjacent teeth 201A-B at the bottom of the slot 204. Opposing surfaces 210A-B and bottom wall 213 define slot 204 which has a radially facing opening 216 generally opposite the bottom wall 213. Each tooth 201 has an axially extending surface 228 wherein the axially extending surfaces 228 of adjacent teeth 201, such as teeth 201A-B, form the axial boundary of radially facing opening 216. Each tooth 201 also has laterally transversely extending flanges 231 integral with the tooth 201 which form part of the axially extending surface 228. The flanges 231 include surfaces 233 which generally oppose the bottom wall 213 of slot 204. Surfaces 233 define at least a portion of the slot 204. Each tooth 201 also has an axially facing surface 234 which is a portion of either end 118 or end 119 of stator core 115.

Figure 3:
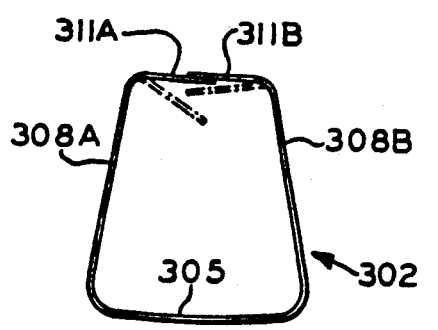
FIG. 3 is an enlarged plan view of a slot liner of the invention.

FIG. 3 shows a slot liner 302 of the present invention. Slot liner 302 is to be disposed in slot 204 between stator core 115 and winding stage 122 and is substantially coterminous with the slot 204 at the longitudinal ends 118 and 119 of the slot 204. In one preferred embodiment of the invention, slot liner 302 is generally rectangular in shape and is folded into the shape illustrated in FIG. 3. Slot liner 302 is formed from an electrical insulator, such as a resilient dielectric film, for electrically insulating the stator core 115 from the winding stages 122 at slot 204. For the sake of simplicity, FIG. 3 illustrates a single slot liner 302 corresponding to slot 204. In one preferred embodiment, stationary assembly 106 includes a plurality of slot liners wherein each slot liner is positioned in its respective slot.

Slot liner 302 has a transverse wall 305 and opposing side walls 308A and 308B projecting outwardly from opposite edge margins of the transverse wall 305. The side walls 308A-B and transverse wall 305 of the slot liner 302 are substantially coterminous with the opposing surfaces 210A-B and bottom wall 213 defining the slot, respectively. Slot liner 302 also includes a flap 311A projecting inwardly from the free edge margin of the side wall 308A. Flap 311A is generally opposite the transverse wall 305. Similarly, a flap 311B projects inwardly from the free edge margin of side wall 308B which is also generally opposite transverse wall 305. The flaps 311A-B overlap to close the radially facing opening 216 of the slot 204.

As described above, the winding stages 122 on the teeth 201 are coils of wire wrapped around the teeth 201 as well as the slot liner 302 (see FIG. 5). As the wire is wrapped, the flaps 311A-B deflect to permit insertion of the wire into the radially facing opening 216 of the slot 204. A deflected position of flaps 311A-B is shown in phantom in FIG. 3. The flaps 311A-B separate the winding stages 122 from the stator core 115 at the flanges 231. In this manner, slot liners 302 isolate in-slot wound magnet wire coils from the laminated steel stator core 115. After flaps 311A-B deflect to allow each winding of winding stage 122 to be wrapped, the flaps 311A-B return to their nondeflected position to close radially facing opening 216 thereby enclosing and retaining the winding stages 122 in slot 204. The shape of the insulating film slot liner 302, particularly flaps 311A-B, eliminates the need for inserting insulating wedges to provide insulative coverage at the surfaces 233 of flanges 231.

Referring to FIG. 4, the motor 100 of one preferred embodiment has eighteen teeth 201. An end cap 401 on the end 118 of the stator core 115 has a plurality of legs 404 with adjacent legs 404A and 404B defining an opening 407 therebetween. The end cap 401 with 18 legs 404 is shown in the embodiment illustrated in FIG. 4. Opening 407 between adjacent legs 404A-B is in registry with the slot 204 such that legs 404 overlie the axially facing surfaces 234 of the teeth 201 for separating the winding stages 122 from the stator core 115 at the axially facing surfaces 234 of the teeth 201. The end cap 401 on end 118 of the stator core 115 constitutes means for retaining the slot liners 302 in their respective slots 204. The retaining means also includes another end cap 401 similarly mounted on the other end 119 of the stator core 115.

End cap 401 has a ring 410 having portions 413 which overlap the longitudinal ends of the slot 204 at end 118 or 119 of the stator core 115. The overlapping portions 413 define a shoulder (see FIG. 7) which overlaps the slot liner 302 at its longitudinal ends to retain slot liner 302 in its respective slot 204. Further, portions 413 of end cap 401 overlap the slot liner 302 at the longitudinal ends of the slot 204 to form a continuous barrier between the winding stages 122 and the stator core 115.

End cap 401 is constructed from an insulative material for electrically insulating the stator core 115 from the winding stages 122 at the axially facing surfaces 234 of the teeth 201, such as a plastic resin. As mentioned above, slot liner 302 is also formed from an electrical insulator, such as a resilient dielectric film, for electrically insulating the stator core 115 from the winding stages 122 at the slots 204.

Each leg 404 has an axially extending portion 414. Portion 414 is located generally at the tip of each leg 404 and is integral thereto to form the boundary of a radially facing opening 415. The present invention, particularly end cap 401 having axially extending portions 414, provides improved wire control in machine winding equipment. Portions 414 provide improved wire control by retaining winding stages 122 in position as they are wrapped across the axially facing surfaces 234 and legs 404.

Reference characters 605, 606, 607 and 608 mark the positions of at least four pins (see FIG. 6) for mounting the end cap 401 on end 118 or 119 of the stator core 115.

FIG. 5 is an enlarged and fragmentary view of the end cap 401 of FIG. 4 mounted on the end 118 or 119 of the stator core 115 for retaining the slot liner 302 in its respective slot 204. FIG. 5 also shows a partial and cross-sectional view of winding stages 122 as wrapped around tooth 201, slot liner 302 and leg 404 of end cap 401.

FIG. 6 illustrates a view of the end cap 401 taken along the line 6—6 of FIG. 4. A surface 602 abuts end 118 or 119 of stator core 115. Reference characters 605 and 606 show pins of FIG. 4. Two pins corresponding to pins 607 and 608 of FIG. 4 are hidden from view by pins 605 and 606, respectively. The pins, such as 605 and 606, are adapted to fit into pin receiving holes (not shown) in the ends 118 and 119 of stator core 115. Pins 605 and 606 and the two hidden pins, may be adhesively joined to stator core 115. As such, pins 605, 606 and the two hidden pins 606, 607, along with the pin receiving holes in the stator core 115, constitute means for mounting end cap 401 on the ends 118 and 119 of the stator core 115.

Referring to FIG. 7, a cross-sectional view of the end cap 401 of FIG. 4 taken along line 7—7 shows aspects of end cap 401 in greater detail. Reference character 413 shows a portion of the shoulder which overlaps the slot liner 302 thereby to retain slot liner 302 in its respective slot 204.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A stationary assembly for a motor, said stationary assembly comprising:
    a stator core having two ends and having a plurality of teeth with adjacent teeth defining a slot therebetween;
    windings on the teeth adapted for energization;
    a slot liner in each of the slots comprising a transverse wall, opposing side walls projecting outwardly from opposite edge margins of the transverse wall, and deflectable flaps projecting inwardly from free edge margins of the side walls generally opposite the transverse wall, the flaps overlapping thereby to close the slot, the slot liner being disposed between the stator core and the windings for insulating the windings from the stator core; and
    means for retaining the slot liners in their respective slots.

2. The stationary assembly of claim 1 wherein each slot has a bottom and is defined by opposing surfaces of adjacent teeth and a wall extending between said adjacent teeth at the bottom of each slot, each slot having a radially facing opening generally opposite the bottom wall, the side walls and transverse wall of the slot liner being substantially coterminous with the opposing surfaces and bottom wall defining the slot, and wherein the overlapping flaps of the slot liner close the radially facing opening of the slot.

3. The stationary assembly of claim 2 wherein the windings comprise coils of wire wrapped around the teeth and the slot liners, the flaps being deflectable thereby to permit insertion of the wire into the radially facing opening of the slot as the wire is wrapped.

4. The stationary assembly of claim 2 wherein the teeth have axially extending surfaces including laterally transversely extending flanges having surfaces generally opposing the bottom wall of each slot and defining at least a portion of the slot, and wherein the flaps separate the windings from the stator core at the flanges.

5. The stationary assembly of claim 1 wherein each slot extends lengthwise generally from end to end of the stator core and has a longitudinal end corresponding to each end of the stator core, the slot liner being substantially coterminous with the slot at the longitudinal ends of the slot.

6. The stationary assembly of claim 5 wherein the teeth have generally axially facing surfaces at the ends of the slots and wherein the retaining means includes an end cap on one of the ends of the stator core having a plurality of legs with adjacent legs defining an opening therebetween, each opening between said adjacent legs being in registry with one of the slots, the legs overlying the axially facing surfaces of the teeth for separating the windings from the stator core at the axially facing surfaces of the teeth.

7. The stationary assembly of claim 6 wherein the retaining means includes an end cap on each end of the stator core, each end cap having a plurality of legs with adjacent legs defining an opening therebetween, each opening between said adjacent legs being in registry with one of the slots, the legs overlying the axially facing surfaces of the teeth for separating the windings from the stator core at the axially facing surfaces of the teeth.

8. The stationary assembly of claim 7 wherein the slot liners and end caps overlap at the longitudinal ends of the slots to form a continuous barrier between the windings and the stator core.

9. The stationary assembly of claim 7 wherein each end cap comprises a ring overlapping the longitudinal ends of the slots at one of the ends of the stator core to define a shoulder, the shoulder overlapping the slot liners thereby to retain the slot liners in their respective slots with respect to the end of the stator core.

10. The stationary assembly of claim 6 further comprising means for mounting the end cap on the end of the stator core.

11. The stationary assembly of claim 6 wherein the end cap is formed from an electrical insulator for electrically insulating the stator core from the windings at the axially facing surfaces of the teeth.

12. The stationary assembly of claim 1 wherein the slot liners are formed from an electrical insulator for electrically insulating the stator core from the windings at the slots.

13. The stationary assembly of claim 1 wherein the slot liners are formed from a resilient dielectric film.

14. The stationary assembly of claim 1 wherein the windings comprise salient windings.

15. The stationary assembly of claim 1 wherein the stator core comprises a cylinder having an inner wall, the teeth extending radially inwardly from the inner wall and wherein the cylinder is centered about the axis of rotation.

16. A motor comprising:
    a rotatable assembly rotating about an axis of rotation;
    a stationary assembly in magnetic coupling relation with the rotatable assembly, said stationary assembly comprising a stator core having two ends and having a plurality of teeth with adjacent teeth defining a slot therebetween;
    windings on the teeth adapted for energization;

a slot liner in each of the slots comprising a transverse wall, opposing side walls projecting outwardly from opposite edge margins of the transverse wall, and deflectable flaps projecting inwardly from free edge margins of the side walls generally opposite the transverse wall, the flaps overlapping thereby to close the slot, the slot liner being disposed between the stator core and the windings for insulating the windings from the stator core; and means for retaining the slot liners in their respective slots.

17. A continuous barrier for electrically insulating a stator core from windings in a motor, the motor having a rotatable assembly and a stationary assembly, said rotatable assembly rotating about an axis of rotation with the rotatable assembly, and the stator core having two ends and a plurality of teeth with adjacent teeth defining a slot therebetween, said barrier comprising:

a slot liner in each of the slots comprising a transverse wall, opposing side walls projecting outwardly from opposite edge margins of the transverse wall and deflect-able flaps projecting inwardly from free edge margins of the side walls generally opposite the transverse wall, the flaps overlapping thereby to close the slot, the slot liner being disposed between the stator core and the windings for separating the windings from the stator core; and an end cap on each end of the stator core having a plurality of legs with adjacent legs defining an opening therebetween, each opening between said adjacent legs being in registry with one of the slots, the legs overlying the axially facing surfaces of the teeth for separating the windings from the stator core at axially facing surfaces of the teeth; and wherein the slot liners and end caps overlap at the ends of the stator core thereby to form a continuous barrier between the windings and the stator core.

18. A slot liner for electrically insulating a stator core from windings in a motor, the stator core being in magnetic coupling relation with a rotor which rotates about an axis of rotation, the stator core having a plurality of teeth with adjacent teeth defining a slot therebetween and having the windings on the teeth adapted for commutation in at least one preselected sequence, each slot being defined by opposing surfaces of adjacent teeth and a wall extending between said adjacent teeth at the bottom of the slot, the slot having a radially facing opening generally opposite the bottom wall, the slot liner being disposed between the stator core and the windings for separating the windings from the stator core, the slot liner comprising:

a transverse wall;

opposing side walls projecting outwardly from opposite edge margins of the transverse wall, the side walls and transverse wall of the slot liner being substantially coterminous with the opposing surfaces and bottom wall defining the slot;

deflectable flaps projecting inwardly from free edge margins of the side walls generally opposite the transverse wall, the flaps overlapping thereby to close the radially facing opening of the slot; and wherein the windings comprise coils of wire wrapped around the teeth and the slot liners, the flaps being deflectable thereby to permit insertion of the wire into the radially facing opening of the slot as the wire is wrapped.

19. The slot liner of claim 18 wherein the teeth have axially extending surfaces including laterally transversely extending flanges having surfaces generally opposing the bottom wall of each slot and defining at least a portion of the slot, and wherein the flaps separate the windings from the stator core at the flanges.

20. The slot liner of claim 18, the slot liner being formed from an electrical insulator for electrically insulating the stator core from the windings at the slots.

21. The slot liner of claim 20 wherein the electrical insulator is a resilient dielectric film.

* * * * *